United States Patent
O'Keeffe

(10) Patent No.: US 10,738,483 B1
(45) Date of Patent: Aug. 11, 2020

(54) FRAMING DEVICE FOR A GLASS FLOOR

(71) Applicant: William F. O'Keeffe, Brisbane, CA (US)

(72) Inventor: William F. O'Keeffe, Brisbane, CA (US)

(73) Assignee: O'KEEFE'S, INC., Brisbane, CA (US)

( * ) Notice: Subject to any disclaimer, the term of this patent is extended or adjusted under 35 U.S.C. 154(b) by 0 days.

(21) Appl. No.: 16/362,438

(22) Filed: Mar. 22, 2019

(51) Int. Cl.
| | |
|---|---|
| *E04F 15/08* | (2006.01) |
| *E04B 5/04* | (2006.01) |
| *E04B 5/46* | (2006.01) |
| *B32B 17/10* | (2006.01) |
| *E04C 1/42* | (2006.01) |

(52) U.S. Cl.
CPC ........ *E04F 15/08* (2013.01); *B32B 17/10311* (2013.01); *E04B 5/046* (2013.01); *E04B 5/46* (2013.01); *E04C 1/42* (2013.01)

(58) Field of Classification Search
CPC .. E04F 15/08; E04B 5/046; E04B 5/46; E04C 1/42; B32B 17/10311
See application file for complete search history.

(56) References Cited

U.S. PATENT DOCUMENTS

| | | | | |
|---|---|---|---|---|
| 4,999,964 | A * | 3/1991 | Taylor | E04B 5/46 52/477 |
| 6,413,618 | B1 * | 7/2002 | Parker | E04F 15/08 428/195.1 |
| 6,446,404 | B1 * | 9/2002 | Bassin | A47B 96/18 428/45 |
| 7,694,475 | B2 * | 4/2010 | Rae | E06B 3/6617 52/263 |
| 9,359,776 | B2 * | 6/2016 | Beltran Albarran | H01L 31/048 |
| 9,435,117 | B2 * | 9/2016 | Zago | B32B 17/10311 |
| 9,441,378 | B1 * | 9/2016 | Conklin | E04D 13/0315 |
| 9,598,867 | B1 * | 3/2017 | Conklin | E04D 13/12 |
| 9,909,309 | B1 * | 3/2018 | Conklin | E04B 5/46 |
| 9,920,532 | B1 * | 3/2018 | Conklin | E06B 3/6617 |
| 9,926,709 | B1 * | 3/2018 | O'Keeffe | E04B 5/46 |
| 10,294,662 | B1 * | 5/2019 | Conklin | E04B 5/023 |
| 2004/0134150 | A1 * | 7/2004 | Rae | E04B 5/46 52/481.1 |
| 2009/0110866 | A1 * | 4/2009 | Ainz | B32B 17/10055 428/53 |
| 2016/0168848 | A1 * | 6/2016 | Zago | B32B 17/10311 52/232 |
| 2020/0024895 | A1 * | 1/2020 | Linden | E06B 7/28 |

FOREIGN PATENT DOCUMENTS

| | | | | |
|---|---|---|---|---|
| DE | 20305238 U1 * | 6/2003 | | E06B 5/165 |
| FR | 2723123 A1 * | 2/1996 | | E04B 1/94 |
| GB | 2574402 A * | 12/2019 | | E04B 5/46 |

* cited by examiner

*Primary Examiner* — Rodney Mintz
(74) *Attorney, Agent, or Firm* — Theodore J. Bielen, Jr.

(57) ABSTRACT

A framing device for a floor structure utilizing a glass floor unit having a durable glass portion and a fire-rated glass portion. A support is positioned to exert a force on the glass floor unit. A shield protects the surfaces of the glass floor unit and forms a pocket for the support.

10 Claims, 3 Drawing Sheets

US 10,738,483 B1

FRAMING DEVICE FOR A GLASS FLOOR

BACKGROUND OF THE INVENTION

The present application relates to a novel and useful glass floor system which may be installed in building structures.

Glass floor structures have been used in the past in substitution for conventional floor units in edifices. Typically, glass floors are constructed in two parts. The upper part normally consists of a durable or structural glass layer, which may take the form of laminated, tempered glass plates. Such structural glass also provides a walking surface for the floor of the building base. A fire-rated glass portion is also placed below the durable structural glass layer and is either connected to the durable glass layer or separated from the same. The fire-rated glass unit typically provides fire protection below the glass floor unit.

In the past, many glass floor systems have been proposed. For example, French patent FR2723123 and U.S. Pat. No. 7,694,475 depict such structures.

U.S. Pat. No. 9,925,709 discloses a significant improvement to such prior art systems by the addition of a post-installation adjustment mechanism to determine the level of the glass floor system in relation to the construction parameters of the building in which the glass floor system has been installed.

Glass floor units, although aesthetically pleasing and compatible with existing structures, often suffer damage prior to installation, during shipping and transport, as well as damage due to traffic on the walking surface, as a result of moving objects and/or vehicles such as skateboards, scooters, and the like.

A glass floor apparatus which is able to resist destructive forces during shipment and after installation would be a notable advance in the construction arts.

SUMMARY OF THE INVENTION

In accordance with the present application, a novel and useful framing device for a glass floor structure is herein provided.

The device of the present application utilizes a glass floor unit consisting of a durable or structural glass floor portion having a walking surface, which is connected to a fire-rated glass portion below the walking surface. The durable glass portion is formed with an undersurface and a side surface in addition to the walking surface.

The glass floor unit is also assembled with a support that is positioned to exert a force on the glass floor unit. The support is linked to a bearing foundation, which is a conventional structure provided by the building itself.

The device of the present application also includes a shield which is provided with a first part that extends over the walking surface of the durable glass portion and a second part that overlies the side surface of the durable glass portion. The shield further includes a third part that forms a pocket for at least partially encompassing the support holding the glass floor unit to the foundation. The shield affords overall impact and abrasion protection to the glass floor unit.

In certain cases, the support may take the form of a plate that lies within the pocket formed within the third part of the shield. In this regard, the shield may take the form of a metallic member and serves to aid in the transfer of loading or any seismic uplift or other forces below the fire-rated glass unit. Such forces may include explosions or bomb blasts.

Where glass floor units are placed adjacent one another to form a large glass floor, shields may be used on multiple glass floor units. In the case of two adjacent glass floor units, the third portions of adjacent shields each form a pocket that encompasses a common support or such common support in the form of a plate, as hereinabove described. The shields of the present application are fully compatible with the adjustment mechanism found in U.S. Pat. No. 9,926,709, hereinabove described.

It may be apparent that a novel and useful framing device for a glass floor structure has been hereinabove described.

It is therefore an object of the present application to provide a framing device for a glass floor structure that aids in the prevention of damage to the glass floor structure during transportation to the building site.

Another object of the present application is to provide a framing device for a glass floor structure that resists damage to the glass floor structure after installation due to walking traffic, as well as moving devices such as carts, scooters, skateboards, and the like.

Another object of the present application is to provide a framing device for a glass floor structure that aids in the transfer of gravitational loading and for other extraneous uplift forces.

Another object of the present application is to provide a framing device for a glass floor structure that is fully compatible with any adjustment mechanisms employed with a particular glass floor unit.

Another object of the present application is to provide a framing device for a glass floor structure that provides a groove or pocket that is usable with adjustment mechanisms known in the prior art.

Another object of the present application is to provide a framing device for a glass floor unit that includes a shield over glass surface portions of the glass floor unit as protection against damaging forces, which may be encountered prior to or after installation of the glass floor unit.

The application possesses other objects and advantages especially as concerns particular characteristics and features thereof which will become apparent as the specification continues.

For a better understanding of the application, reference is made to the following detailed description of the preferred embodiments thereof which should be referenced to the prior described drawings.

DETAILED DESCRIPTION OF THE PREFERRED EMBODIMENTS

Various aspects of the present application will evolve from the following detailed description of the preferred embodiments thereof which should be referenced to the prior delineated drawings.

Figure 1:
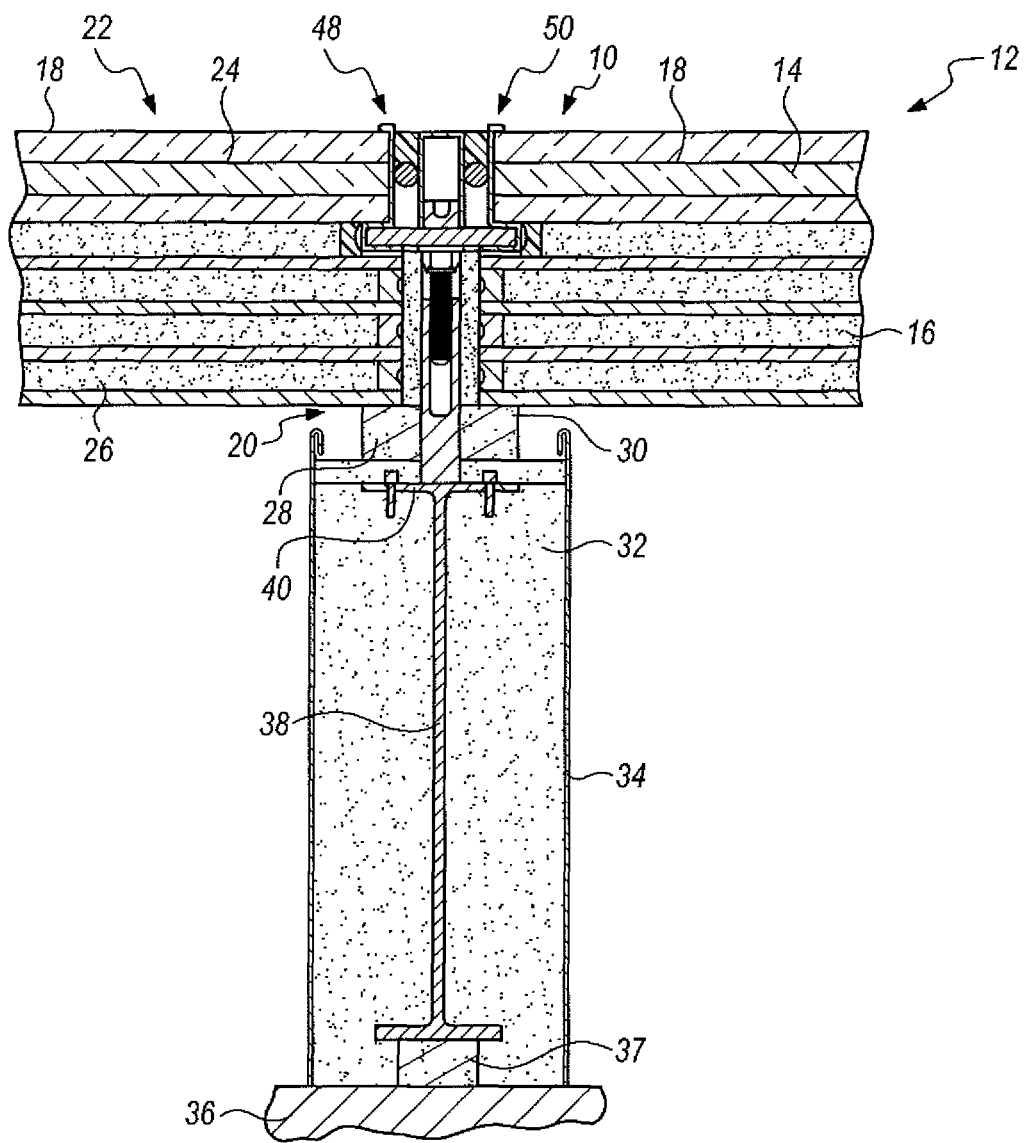
FIG. 1 is a sectional view showing a pair of glass units installed above a foundation utilizing the framing device of the present application.

The invention as a whole is depicted in the drawings by reference character 10. Framing device 10 is depicted in FIG. 1 as being part of a glass floor unit 12. Glass floor unit 12 is fashioned with a durable or structural glass, upper portion 14, and a lower fire-rated glass portion 16. Structural glass portion 14 may comprise multiple layers of tempered glass that are laminated to one another. As such, a walking surface 18 is provided that is exposed to traffic of various sorts. For example, in addition to ambulatory traffic, walking surface 18 is typically used for carts, rolling furniture, skateboards, scooters, and the like. As shown in FIG. 1, glass floor unit is employed with a support 20 which may include a prior art adjuster 21 to raise and lower glass floor units 12, as well as an adjacent glass floor unit 22 having structural glass portion 24 and fire-rated glass portion 26. Walking surface 18 is indicated in the drawing to extend across both glass units 12 and 22. It should be noted that fire-rated glass portions 16 and 26 of glass floor units 12 and 22, respectively, may be in the form of a glass panel identified as Superlite-II-XLF, which is available from SaftiFirst of Brisbane, Calif. Glass floor units 12 and 22 sit atop gypsum boards 28 and 30, which in turn lie atop concrete post 32. Closure 34 encases and serves as a form for the pouring of concrete post 32 positioned on foundation or base 36. Beam 38 within concrete post 32 is typically attached to foundation or base 36, which may be embodied as a building support such as a wall, a bracket attached to a wall, and the like. Gypsum board block 37 is glued to beam 38 prior to the pouring of concrete post 32. Beam 38 within concrete post 32 extends upwardly to a flange 40 beneath gypsum boards 28 and 30.

Figure 2:
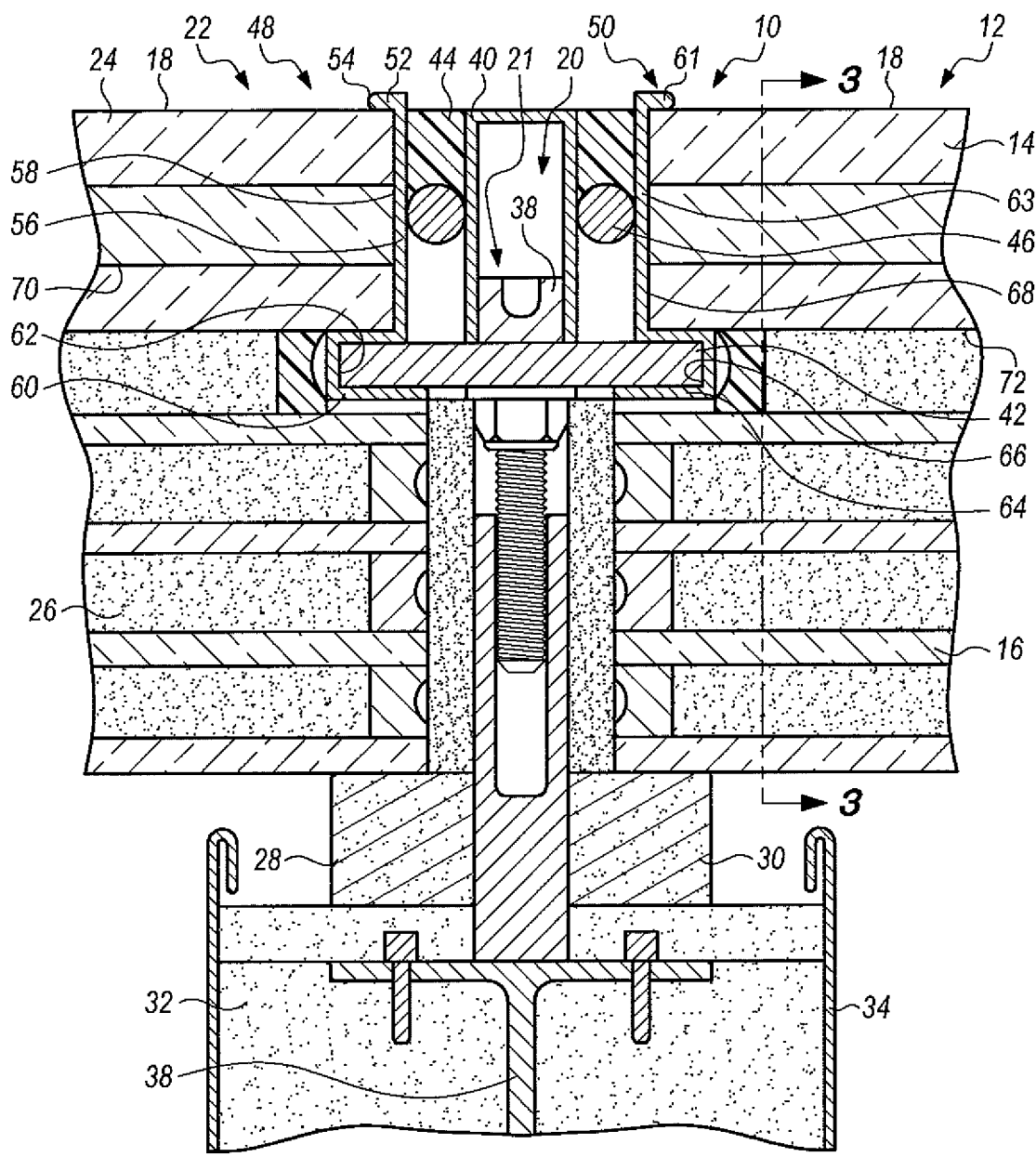
FIG. 2 is an enlarged partial sectional view of FIG. 1 amplifying the framing device of the present application in use on a pair of glass floor units.

Turning to FIG. 2, it may be observed that device 10 is more clearly depicted. Support 20 is depicted as including an adjustment bolt 38 of adjuster 21 positioned within channel 40 and a plate 42 which is capable of moving upwardly and downwardly to adjust the position of glass floor units 12 and 22. Seals 44 and 46 lie adjacent channel 40. A pair of shields 48 and 50 are used to protect glass floor units 12 and 22 against damaging forces. With respect to shield 48, a first part 52 thereof extends over walking surface 18 of glass floor unit 22. First part 52 is relatively narrow in width, extending 1.5 cm or less in height above walking surface 18. First part 52 is also formed with a relieved edge portion 54 which may take the form of a chamfered, beveled, rounded, or like configuration. Shield 48 also is formed with a second part 56 that overlies side surface 58 of glass floor unit 22. A third part 60 of shield 48 assumes a U-shaped configuration and forms a pocket 62 which at least partially encompasses a plate 42 of support 20. It should be realized that the structure of shield 50 with respect to glass floor unit 12 possesses the same structure and is illustrated in FIG. 2 as being a mirror image of shield 48. Notably, a first part 61, having a relieved portion, extends over walking surface 18. Needless to say, shield 50 also possesses a third part 64 that forms a pocket 66 to at least partially encompass plate 42 of support 20. In this manner, the walking surface 18 of glass units 12 and 22 are protected against damage, especially at the corners thereof from traffic on walking surface 18. Also, side surface 58 of glass floor unit 22 and side surface 68 of floor unit 12 are protected by second parts 56 and 63, respectively, which is especially useful during transport and positioning of glass floor units 12 and 22. It should also be noted that the undersurface 70 of glass floor unit 22 and the undersurface 72 of glass floor unit 12 are overlain by third part 64 of shield 50 and third part 60 of shield 48, respectively. This positioning of third parts 64 and 60 of shields 50 and 48 aids device 10 in the transferring of load from uplift forces that may occur due to seismic events, bomb blasts, and the like below fire-rated glass portions 16 and 26.

Figure 3:
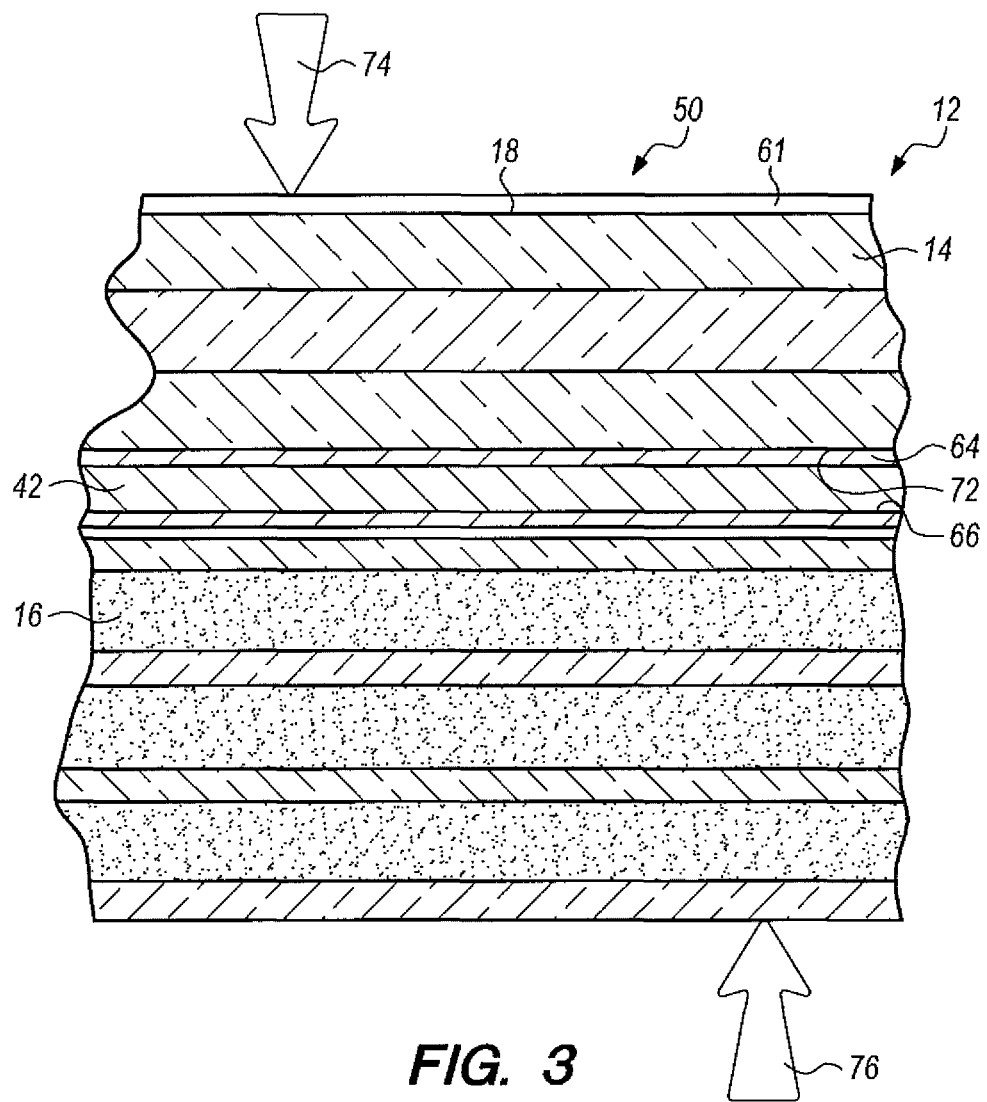
FIG. 3 is a sectional view taken along line 3-3 of FIG. 2.

FIG. 3 shows the relative positioning of the heretofore described elements of device 10. It should also be realized that directional arrows 74 and 76 represent the forces exerted by traffic on walking surface 18 and the lift force exerted on device 10 by bomb blast, seismic, or other environmental reacting forces, respectively.

While in the foregoing embodiments of the application have been set forth in considerable detail for the purposes of making a complete disclosure of the invention, it may be apparent to those of skill in the art that numerous changes may be made in such detail without departing from the spirit and principles of the application.

What is claimed is:

1. A framing device for a floor structure positioned on a foundation, comprising:
    a glass floor unit, said glass floor unit comprising a durable glass portion, including a walking surface, an undersurface, and a side surface located intermediate said walking surface, said undersurface, and a connected fire-rated glass portion;
    a support, said support positioned to exert a force on said glass floor unit, and being linked to the foundation for bearing thereupon, said support further comprising a plate; and
    a shield, said shield comprising a first part extending over said walking surface of said durable glass portion, a second part overlying said side surface of said durable glass portion, and a concave-shaped third part defining a pocket at least partially encompassing said plate, said third part of said shield configured to overlay said undersurface of said durable glass portion.

2. The device of claim 1 in which said third part of said shield overlies a section of said fire-rated glass portion of said glass floor unit.

3. The device of claim 1 in which said first part of said shield includes a relieved edge portion.

4. The device of claim 1 in which said shield comprises a metallic member.

5. The device of claim 4 in which said third part of said shield overlies a section of said fire-rated glass portion of said glass floor unit.

6. The device of claim 1 in which said glass floor unit comprises a first glass floor unit and which further comprises a second glass floor unit, said second glass floor unit comprising a durable glass portion including a walking surface, an undersurface, and a side surface intermediate said walking surface and said undersurface;
    said shield comprising a first shield and which further comprises a second shield, said second shield comprising a first part overlying said walking surface of said second glass floor unit, a second part overlying said side surface of said second glass floor unit and a third part forming a pocket for at least partially encompassing said plate, said plate being positioned to exert force on said second glass floor unit, said pocket formed by said third part of said second shield at least partially encompassing said plate.

7. The device of claim 6 in which said third part of said second shield is configured to overly said undersurface of said durable glass portion of said second glass floor unit.

8. The device of claim 6 in which said second shield comprises a metallic member.

9. The device of claim 6 in which said support further comprises an adjuster moving said first and second glass floor units relative to the foundation.

10. The device of claim 6 in which first part of said second shield includes a relieved edge portion.

* * * * *